US011132923B2

(12) United States Patent
Jaenisch et al.

(10) Patent No.: US 11,132,923 B2
(45) Date of Patent: Sep. 28, 2021

(54) ENCRYPTION USING SPATIAL VOTING

(71) Applicant: Raytheon Company, Waltham, MA (US)

(72) Inventors: Holger M. Jaenisch, Toney, AL (US); James W. Handley, Toney, AL (US); Guy G. Swope, Reston, VA (US)

(73) Assignee: Raytheon Company, Waltham, MA (US)

( * ) Notice: Subject to any disclaimer, the term of this patent is extended or adjusted under 35 U.S.C. 154(b) by 50 days.

(21) Appl. No.: 16/379,162

(22) Filed: Apr. 9, 2019

(65) Prior Publication Data

US 2020/0202749 A1 Jun. 25, 2020

Related U.S. Application Data

(60) Provisional application No. 62/655,580, filed on Apr. 10, 2018.

(51) Int. Cl.
*G09C 1/00* (2006.01)
(52) U.S. Cl.
CPC ...................... *G09C 1/00* (2013.01)
(58) Field of Classification Search
CPC ..................................................... G09C 1/00
See application file for complete search history.

(56) References Cited

U.S. PATENT DOCUMENTS

| 6,760,032 | B1 | 7/2004 | James |
| 7,036,016 | B1* | 4/2006 | Smith, Jr. ............ G09C 1/00 340/5.51 |
| 8,839,417 | B1 | 9/2014 | Jordan |
| 9,245,116 | B2 | 1/2016 | Evans et al. |
| 10,110,629 | B1 | 10/2018 | Kruse et al. |
| 10,326,796 | B1 | 6/2019 | Varadarajan et al. |
| 10,521,584 | B1 | 12/2019 | Sharifi Mehr |
| 10,937,465 | B2 | 3/2021 | Jaenisch et al. |
| 2003/0084349 | A1 | 5/2003 | Friedrichs et al. |
| 2003/0174895 | A1 | 9/2003 | Hsieh |

(Continued)

FOREIGN PATENT DOCUMENTS

| EP | 2942919 A1 | 11/2015 |
| WO | WO-2019119675 A1 | 10/2019 |

(Continued)

OTHER PUBLICATIONS

"U.S. Appl. No. 16/281,888, Corrected Notice of Allowability dated Jan. 27, 2021", 2 pgs.

(Continued)

*Primary Examiner* — Lynn D Feild
*Assistant Examiner* — Vladimir I Gavrilenko
(74) *Attorney, Agent, or Firm* — Schwegman Lundberg & Woessner, P.A.

(57) ABSTRACT

A method of encryption using spatial voting can include determining a first feature and a second feature of user data, wherein the first feature and the second feature correspond to a cell of a subset of cells of a grid of cells, each cell of the subset of cells including a character associated therewith, altering one or more values of the first feature and the second feature to generate an altered first feature and an altered second feature, and concatenating the altered first feature and the altered second feature to generate encrypted data.

17 Claims, 13 Drawing Sheets

(56) References Cited

U.S. PATENT DOCUMENTS

| | | | |
|---|---|---|---|
| 2006/0101516 | A1 | 5/2006 | Sudaharan et al. |
| 2007/0245119 | A1* | 10/2007 | Hoppe ................ H04L 45/7453 |
| | | | 711/216 |
| 2009/0241006 | A1 | 9/2009 | Liikanen et al. |
| 2010/0064370 | A1 | 3/2010 | Charnley et al. |
| 2013/0145465 | A1 | 6/2013 | Wang et al. |
| 2015/0026582 | A1* | 1/2015 | Basak .................. H04L 41/142 |
| | | | 715/734 |
| 2015/0100556 | A1 | 4/2015 | Sekiguchi et al. |
| 2015/0131796 | A1* | 5/2015 | Milsted ................ H04L 9/0869 |
| | | | 380/44 |
| 2015/0154796 | A1 | 6/2015 | Co |
| 2015/0206315 | A1 | 7/2015 | Price et al. |
| 2015/0295907 | A1 | 10/2015 | Abrahamson |
| 2016/0321323 | A1 | 11/2016 | Gaumnitz et al. |
| 2016/0359685 | A1 | 12/2016 | Yadav et al. |
| 2016/0359886 | A1 | 12/2016 | Yadav et al. |
| 2017/0149787 | A1 | 5/2017 | Niemela et al. |
| 2017/0257396 | A1 | 9/2017 | Shen et al. |
| 2017/0302691 | A1 | 10/2017 | Singh et al. |
| 2017/0310690 | A1 | 10/2017 | Mestha et al. |
| 2018/0027004 | A1 | 1/2018 | Huang et al. |
| 2018/0337935 | A1 | 11/2018 | Marwah et al. |
| 2019/0018375 | A1 | 1/2019 | Deshpande et al. |
| 2019/0149565 | A1 | 5/2019 | Hagi et al. |
| 2019/0196746 | A1 | 6/2019 | Fujimoto et al. |
| 2019/0279112 | A1 | 9/2019 | Jaenisch et al. |
| 2019/0289034 | A1 | 9/2019 | Erez et al. |
| 2019/0296913 | A1* | 9/2019 | Verma ................. H04L 63/0838 |
| 2019/0311120 | A1 | 10/2019 | Jaenisch et al. |
| 2019/0312908 | A1 | 10/2019 | Jaenisch et al. |
| 2019/0383874 | A1 | 12/2019 | Jaenisch et al. |
| 2020/0272731 | A1 | 8/2020 | Jaenisch et al. |
| 2020/0273499 | A1 | 8/2020 | Jaenisch et al. |
| 2020/0326695 | A1 | 10/2020 | Jaenisch et al. |
| 2021/0027171 | A1 | 1/2021 | Jaenisch et al. |

FOREIGN PATENT DOCUMENTS

| | | | |
|---|---|---|---|
| WO | WO-2019199769 | A1 | 10/2019 |
| WO | WO-2019199777 | A1 | 10/2019 |
| WO | WO-2020172122 | A1 | 8/2020 |
| WO | WO-2020172124 | A1 | 8/2020 |
| WO | WO-2021016533 | A1 | 1/2021 |

OTHER PUBLICATIONS

"U.S. Appl. No. 16/281,888, Examiner Interview Summary dated Aug. 10, 2020", 3 pgs.

"U.S. Appl. No. 16/281,888, Non Final Office Action dated May 19, 2020", 15 pgs.

"U.S. Appl. No. 16/281,888, Notice of Allowance dated Oct. 20, 2020", 12 pgs.

"U.S. Appl. No. 16/281,888, Response filed Aug. 18, 2020 to Non Final Office Action dated May 19, 2020", 10 pgs.

"U.S. Appl. No. 16/379,154, Examiner Interview Summary dated Jan. 8, 2021", 2 pgs.

"U.S. Appl. No. 16/379,154, Non Final Office Action dated Oct. 15, 2020", 25 pgs.

"U.S. Appl. No. 16/379,154, Response filed Jan. 14, 2021 to Non Final Office Action dated Oct. 15, 2020", 10 pgs.

"International Application Serial No. PCT/US2019/026338, International Preliminary Report on Patentability dated Oct. 22, 2020", 9 pgs.

"International Application Serial No. PCT/US2019/026514, International Preliminary Report on Patentability dated Oct. 22, 2020", 7 pgs.

"International Application Serial No. PCT/US2019/026522, International Preliminary Report on Patentability dated Oct. 22, 2020", 7 pgs.

"International Application Serial No. PCT/US2020/018570, International Search Report dated Apr. 28, 2020", 4 pgs.

"International Application Serial No. PCT/US2020/018570, Written Opinion dated Apr. 28, 2020", 7 pgs.

"International Application Serial No. PCT/US2020/018574, International Search Report dated Apr. 28, 2020", 4 pgs.

"International Application Serial No. PCT/US2020/018574, Written Opinion dated Apr. 28, 2020", 7 pgs.

"International Application Serial No. PCT/US2020/043434, International Search Report dated Oct. 16, 2020", 4 pgs.

"International Application Serial No. PCT/US2020/043434, Written Opinion dated Oct. 16, 2020", 5 pgs.

Deng, Song, et al., "Distributed intrusion detection based on hybrid gene expression programming and cloud computing in a cyber physical power system", IET Control Theory and Applications, The Institution of Engineering and Technology. GB, vol. 11, No. 11, (Jul. 14, 2017), 1822-1829.

Elsayed, Saber, et al., "Evaluating the performance of a differential evolution algorithm in anomaly detection", IEEE Congress on Evolutionary Computation (CEC), IEEE, (May 25, 2015), 2490-2497.

Holnglei, Gao, et al., "A GEP-Based Anomaly Detection Scheme in Wireless Sensor Networks", Computational Science and Engineering, CSE '09. International Conference on, IEEE, Piscataway, NJ, USA, (Aug. 29, 2009), 817-822.

"International Application Serial No. PCT/US2019/026338, International Search Report dated Jun. 21, 2019", 5 pgs.

"International Application Serial No. PCT/US2019/026338, Written Opinion dated Jun. 21, 2019", 7 pgs.

"International Application Serial No. PCT/US2019/026514, International Search Report dated Jul. 5, 2019", 5 pgs.

"International Application Serial No. PCT/US2019/026514, Written Opinion dated Jul. 5, 2019", 8 pgs.

"International Application Serial No. PCT/US2019/026522, International Search Report dated Jul. 8, 2019", 4 pgs.

"International Application Serial No. PCT/US2019/026522, Written Opinion dated Jul. 8, 2019", 5 pgs.

Farlow, Stanley, "The GMDH Algorithm of Ivakhnenko", The American Statistician, vol. 35, No. 4, (1981), 210-215.

Ferreira, Candida, "Gene Expression Programming in Problem Solving", Soft Computing and Industry, (2002), 635-653.

Ferreira, Candida, "Gene Expression Programming: A New Adaptive Algorithm for Solving Problems", Complex Systems, vol. 13, issue 2, (2001), 22 pgs.

Gabor, D, et al., "A Universal Non-linear filter, predictor and simulator which optimizes", The Institution of Electrical Engineers, Paper No. 3270 M, (1960), 422-435.

Ivakhnenko, A G, "Heuristic Self-Organization in Problems of Engineering Cybernetics", Automatica, vol. 6, (1969), 207-219.

Ivakhnenko, A G, et al., "The Review of Problems Solvable by Algorithms of the Group Method of Data Handling (GMDH)", Pattern Recognition and Image Analysis, vol. 5, No. 4, (1995), 527-535.

Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.

Jaenisch, Holger, et al., "A novel application of data modeling for extracting mathematical ontologies and relationship matrix features from text documents", SPIE Defense + Commercial Sensing, (2005), 12 pgs.

Jaenisch, Holger, et al., "A robust regularization algorithm for polynomial networks for machine learning", Proc. SPIE 8059, Evolutionary and Bio-Inspired Computation: Theory and Applications V, 80590A, (May 2011), 21 pgs.

Jaenisch, Holger, et al., "Autonomous Journaling Response Using Data Model LUTS", Proc. of SPIE vol. 7344, (2009), 11 pgs.

Jaenisch, Holger, "Converting data into functions for continuous wavelet analysis", Proceedings of SPIE—The International Society for Optical Engineering, (pp. 2-13), (2009), 13 pgs.

Jaenisch, Holger, "Data Modeling Applications in Space Science and Astronomy", PhD thesis, James Cook University (pp. 1-130 of 255 pages total), (2009), 130 pgs.

(56) References Cited

OTHER PUBLICATIONS

Jaenisch, Holger, "Data Modeling Applications in Space Science and Astronomy", PhD thesis, James Cook University (pp. 131-256 of 255 pages total), (2009), 126 pgs.

Jaenisch, Holger, et al., "Data Modeling for Change detection of Inventory Flow and Instrument Calibration", Southeastern Simulation Conference, (2003), 10 pgs.

Jaenisch, Holger, et al., "Data Modeling for Change Detection of Inventory Flow and Instrument Calibration", Proceedings of SOLE, (2003), 10 pgs.

Jaenisch, Holger, et al., "Data Modeling for Fault Detection", MFPT, (2003), 10 pgs.

Jaenisch, Holger, et al., "Data Modeling for network dynamics", Proceedings of SPIE—The International Society for Optical Engineering, (2004), 12 pgs.

Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.

Jaenisch, Holger, et al., "Data-modeling-enabled guidance, navigation, and control to enhance the lethality of interceptors against maneuvering targets", Proceedings of SPIE—The International Society for Optical Engineering • Mar. 2005, 13 pgs.

Jaenisch, Holger, et al., "Digital MicroArray Analysis for Digital Artifact Genomics", Cyber Sensing, (2013), 20 pgs.

Jaenisch, Holger, "Entropyology: Microarray Analysis Analogy for Digital Artifact Discrimination", Proceedings of SPIE, vol. 8359, (2012), 20 pgs.

Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.

Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.

Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.

Jaenisch, Holger, et al., "Shai-Hulud The quest for worm sign", Proc. SPIE 5812, Data Mining, Intrusion Detection, Information Assurance, and Data Networks Security, (2005), 9 pgs.

Jaenisch, Holger, et al., "Spatial Voting for Automatic Feature Selection, Fusion and Visualization", Proc. SPIE 8756, Multisensor, Multisource Information Fusion: Architectures, Algorithms, and Applications, (2013), 21 pgs.

Jaenisch, Holger, "Spatial Voting with Data Modeling", Sensor Fusions and its Applications, (2010), 153-178.

Jaenisch, Holger, et al., "Virtual Instrument Prototyping with Data Modeling", (2003), 15 pgs.

Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).

Oltean, Mihai, et al., "An autonomous GP-based system for regression and classi?cation problems", Applied Soft Computing 9, (2009), 49-60.

"U.S. Appl. No. 16/379,154, Final Office Action dated Apr. 29, 2021", 32 pgs.

* cited by examiner

ENCRYPTION USING SPATIAL VOTING

RELATED APPLICATION

This application claims the benefit of priority to U.S. Provisional Patent Application Ser. No. 62/655,580, filed on Apr. 10, 2018, and titled "Graphics Processing Unit Data Encryption", which is incorporated herein by reference in its entirety.

TECHNICAL FIELD

Embodiments described herein generally relate to encryption using spatial voting (SV).

BACKGROUND

Developers of computer security systems are developing ways to help ensure safety of their information technology (IT) infrastructure. Some use encryption techniques for the safety of their data. The encryption can be performed in hardware or software. Software encryption is cheap and does not require additional hardware. However, software encryption processes and software encryption are only as secure as the rest of a computer. If an attacker can determine a password, the encryption/decryption can be easily determined. Software encryption processes share processing resources with the rest of the processes. The extra operations of the encryption process can slow down the other operations operating on the same resources.

Hardware encryption is a separate processor dedicated to encryption (and sometimes some authentication tasks). Hardware encryption is safer than software encryption because the encryption process is separate from the rest of the computer, making it harder to intercept or break the key. The use of the dedicated processor relieves the burden of encryption from the rest of the device, making the encryption and decryption much faster. However, hardware encryption is typically more expensive to implement than software encryption. Also, if the dedicated processor fails, it becomes very difficult to access data on the computer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of embodiments are directed to data security using SV. The data security can include a form of encryption that provides one or more advantages over other encryption techniques. Other encryption techniques operate based on the difficulty of prime factorization. Prime factorization is a process of identifying which prime numbers, when multiplied together, equal an original number. The encryption key (sometimes called "public key") is usually determined based on a product of two large prime numbers. The decryption key (sometimes called "secret key") is determined based on the two large prime numbers themselves. One who knows the prime factorization can more easily decrypt the data because they do not need to perform the difficult, time consuming factorization.

The prime factorization encryption techniques tend to have a relatively high entropy. Thus, an attacker can generally identify whether data is encrypted using one of the prime factorization techniques by testing the entropy of the data. Further, the prime factorization is so well known that some attackers have created faster and faster ways of performing factorization. The response in the cryptography has been to increase the size of the data used to generate the prime numbers. That is, factoring 32-bit data into two prime numbers can take much less time than factoring 128-bit or 256-bit data since, at least in part, the number of prime numbers available is so much greater.

Embodiments herein encrypt data without using prime factorization. The embodiments have lower entropy than the prime factorization techniques. Thus, if an attacker is testing the entropy of the data to determine whether it is encrypted, they might think that the data is not encrypted. The encryption can occur quickly, in hardware or software, as it relies only on simple, deterministic functions. Further, the encryption allows for variability in representing a character. A deterministic, random-like function can add "noise-like" perturbances to the data representing a specific character and the data can decrypt to the same character. This is due, at least in part, to the SV process and the manner in which an associated SV grid can be set up. The set up can include arranging a grid of cells such that any input that maps to a cell is associated with a pre-defined character. As long as the perturbed input remains within that cell, it can decrypt to the proper character.

Figure 1:
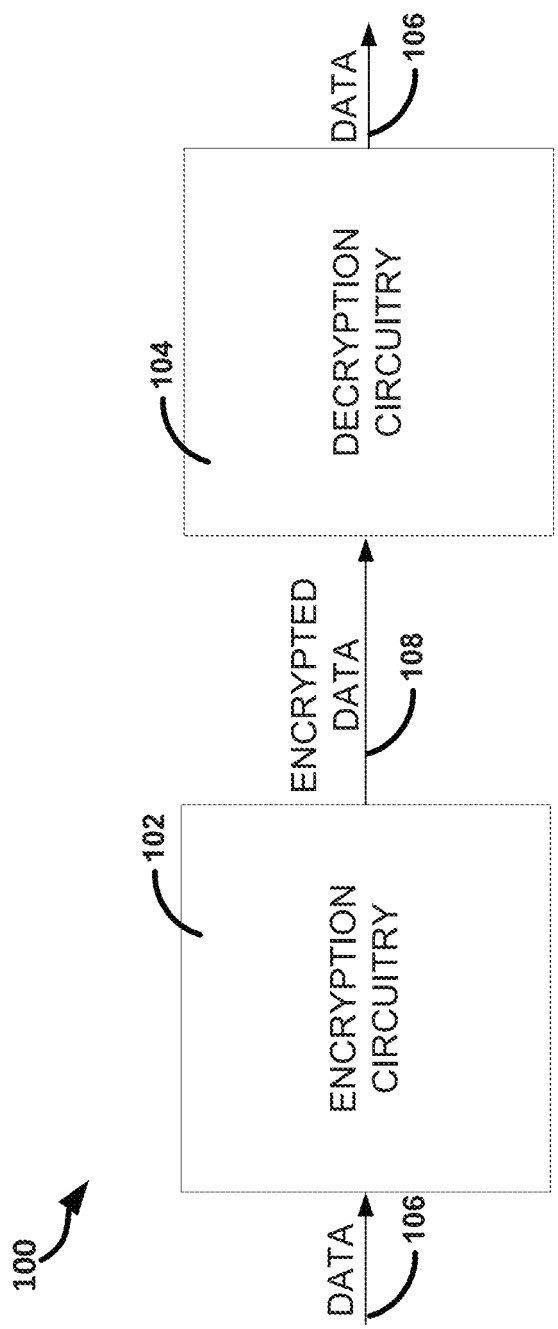
FIG. 1 illustrates, by way of example, a diagram of an embodiment of a system for performing encryption and decryption.

FIG. 1 illustrates, by way of example, a diagram of an embodiment of a system 100 for performing encryption and decryption. The system 100 as illustrated includes encryption circuitry 102 and decryption circuitry 104. The encryption circuitry 102 receives data 106 and generates encrypted data 108. The encryption circuitry 102 translates the data 106 into a code, or in the language of FIG. 1, the encrypted data 108. The encrypted data 108 is sometimes called ciphertext. The unencrypted data 106 is sometimes called plaintext.

The decryption circuitry 104 receives the encrypted data 108 and generates the data 106. The decryption circuitry 104 reverses the operations performed by the encryption circuitry 102. This reversal is sometimes called performing an inverse transform. The decryption circuitry 104 translates the encrypted data 108 back into the data 106.

Circuitry includes electric or electronic components that can be configured individually as hardware or with software or firmware to perform operations. For example, encryption circuitry 102 is configured to perform encryption operations and the decryption circuitry 104 is configured to perform decryption operations. The electric or electronic components can include one or more transistors, resistors, capacitors, diodes, inductors, logic gates (e.g., AND, OR, XOR, negate, buffer, or the like), switches, multiplexers, oscillators, analog-to-digital converters, digital-to-analog converters, processors (e.g., central processing units (CPUs), graphics processing units (GPUs), field programmable gate arrays (FPGAs), application specific integrated circuits (ASICs), or the like), regulators, power supplies, or the like.

Figure 2:
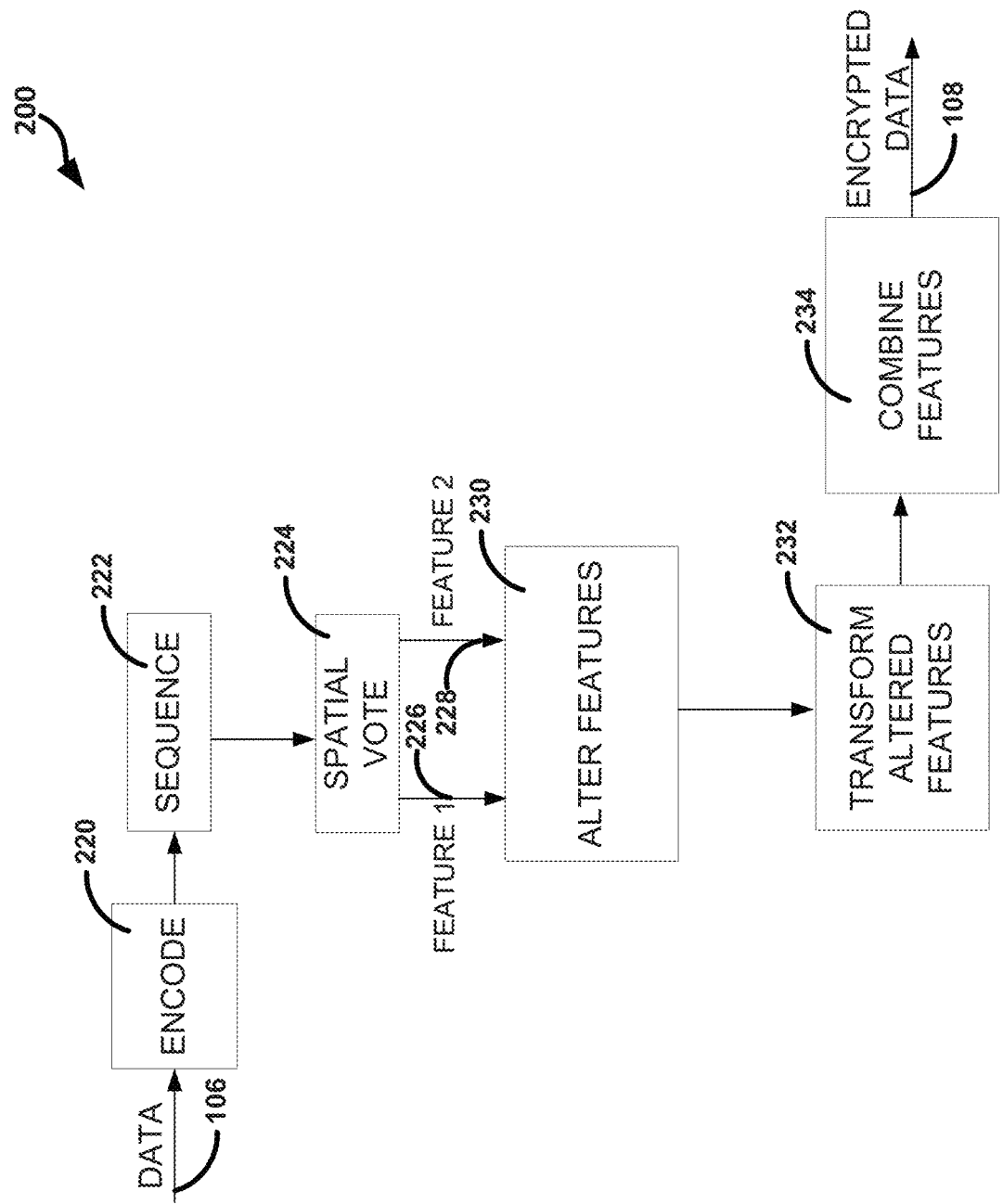
FIG. 2 illustrates, by way of example, a diagram of an embodiment of a method for encryption.

FIG. 2 illustrates, by way of example, a diagram of an embodiment of a method 200 for encryption. The method 200 can be performed by the encryption circuitry 102. The method 200 includes an encoding operation 220 performed on the data 106. The encoding operation 220 can transform the data 106 to a series of values. The series of values can include a predefined range of values. An example encoding is the American Standard Code for Information Interchange (ASCII) encoding. In ASCII, data is converted to a number in the range of values [0, 255]. The data 106 can already be encoded, thus the encoding operation 220 can be optional. Other examples of encodings include portable data format (PDF), Unicode transformation format 8 or 16 (UTF-8, UTF-16) or other Unicode format, among others. The encoding operation 220 can include retaining leading zeros as the leading zeros can affect results of a sequence operation 222 and an SV operation 224.

The sequence operation 222 can receive encoded data from the encoding operation 220 or the pre-encoded raw data if the data 106 is encoded. The sequence operation 222 can generate a version of the encoded data with one or more values repeated. In some embodiments, the sequence operation 222 can repeat each individual value of the encoded data a specified number of times. For example, consider the encoded value "108". The sequence operation 222 can generate the data "110088". In this example, the specified number of times is one (1). The repetition can be at the bit-level, byte-level, multiple byte-level, or the like.

A spatial vote (SV) operation 224 can determine features 226, 228 to which the encoded data maps. The SV operation 224 can determine a first feature and a second feature of the encoded data. The features, in combination, can correspond to a location on an SV grid. More details regarding the SV operation 224 and the SV grid are provided regarding at least FIGS. 2-10.

At operation 230, the features 226, 228 can be optionally altered. The operation 230 can include rounding values of the features 226, 228 to a specified decimal place, such as zero, one, two, etc. decimal places. Instead of rounding, the operation can include a ceiling operation, floor operation, or the like.

The operation 232 can include transforming the altered (or unaltered) features. Transforming the features can include using a combination of orthogonal functions to vary a value of one or more of the features. A first function of the orthogonal functions can be used on a first value to generate a first intermediate value. The first function can include a cyclic function, periodic function, or the like. A cyclic function is one that produces a same output for different input. A periodic function is a special case of a cyclic function that repeats a series of output values for different input values. Examples of periodic functions include sine, cosine, or the like. In some embodiments, the first value can be raised to a power before being input into the first function. The power can be any value, such as an integer, fraction, transcendental number, or the like.

A second function can operate on a second value to generate a second intermediate value. The second function can be orthogonal to the first function. In some embodiments, the second value can be raised to a power before being input into the second function. The power can be any value, such as an integer, fraction, transcendental number, or the like. Using a transcendental number can increase memory or processing overhead but can produce results that are more random than a fraction or integer.

The first intermediate value and the second intermediate value can be mathematically combined to generate a result. The mathematical combination can include weighting either the first intermediate value or the second intermediate value. In some embodiments, the weighting can constrain the result to a specified range of values (e.g., [min, max]). For example, to constrain the result in which the first function is a sine function, the second function is a cosine function, and the mathematical combination is addition, the weighting can include division by two. The mathematical combination can include an addition, multiplication, division, subtraction, logarithm, exponential, integration, differentiation, transform, or the like. The mathematical combination can include adding a constant to shift the range of values to be more positive or more negative.

In mathematical terms, the following Result equation summarizes the functions used to produce the result:

$$\text{Result} = a * \text{firstfunction}((1\text{stvalue})^x) \blacksquare b * \text{secondfunction}((2\text{nd value})^y) + c$$

Where ■ indicates one or more mathematical operations to perform the mathematical combination, a and b are the weights, x and y are the powers, and c is the constant (e.g., an integer or real number). The $1^{st}$ value can be a portion of the first feature and the $2^{nd}$ value can be a portion of the second feature. The portion can include a hundreds digit, tens digit, ones digit, tenths digit, hundredths digit, thousandths digit, a different digit, a combination thereof, or the like. In some embodiments, the $1^{st}$ value can be a thousandths digit (third value after the decimal) of the feature 226. In some embodiments, the $2^{nd}$ value can be a thousandths digit of the feature 228.

Operation 234 can include converting the first feature and the second feature to corresponding integer values of a specified number of digits. The specified integer value can be in a specified range of values. For example, the specified integer value can be in the range [0, 10,000), or other range of values. The two integer values can be combined, at operation 234, as feature1.feature2. That is, the feature 1 integer value can define the values to the left of a decimal and the feature 2 integer value can define the values to the right of the decimal. Any of the digits of the feature 1 integer value or the feature 2 integer value can be replaced with a perturbed version of the digits (e.g., using the Result equation presented above). For example, the digit immediately to the left of the decimal (a least significant digit of the first feature 226) and a digit in the ten-thousandths place can be replaced with a value determined based on the Result equation (a least significant digit of the second feature 228) and the value of the digit.

In some embodiments, the operation 234 can include generating a series of values using the Result equation. The series of values can be used to perturb the combined features and generate the encrypted data 108. For example, consider an embodiment in which the first function is sine and the second function is cosine. Such a function is sometimes called a SINCOS function. In mathematical terms SINCOS can be:

$$SINCOS = 0.25*(\sin((x+A)^{e(1)}) + \cos((x+B)^{e(1)}) + 2)$$

Where x is a counter variable, A is the first value, and B is the second value. In some embodiments a series of four values, R1, R2, R3, R4 can be generated using the SINCOS function. The values can be mathematically altered, such as to constrain the values to within a specified range. For example, one or more of the RX values can be constrained to being in the set [−1, 0, 1], the set [0.0000, 0.0010), the set [0.0000, 1.0000), other set or the like. In some examples, one or more of RX values can be operated on by one or more multiplications, divisions, rounding, floor, ceiling, addition or the like. One or more of the raw or altered RX values can be combined with one or more of the digits of the raw or altered features to generate the encrypted data 108.

In one embodiment the encrypted data 108 can be determined as follows, where R1, R2, R3, and R4 are determined initially using SINCOS and x is incremented between determining the values:

$$encrypteddata = R1 + (R4 + feature1)*100 + R3 + \left(\frac{feature2}{100}\right) + R2$$

where feature 1 and feature 2 are different ones of the features defined elsewhere herein, $$R1 = -1, 0, 1 \text{ if } 2*\left(\frac{floor(R1*10+0.5)}{10}\right) - 1 < -0.5,$$

$$2*0.5 > \left(\frac{floor(R1*10+0.5)}{10}\right) - 1 < -0.5,$$

$$2*\left(\frac{floor(R1*10+0.5)}{10}\right) - 1 > 0.5,$$

respectively, $R2 = floor(R2*10+0.5)/10000$, $R3 = floor(R3*10+0.5)/10$, and $R4 = 10*floor(R4*10)$.

Another way to describe the encrypted data is digit-by-digit. The following table explains what each digit of the encrypted data is for the example just described:

TABLE 1

| | | | | Encrypted Data Digit-by-Digit | | | | |
|---|---|---|---|---|---|---|---|---|
| sin cos R4 | feat. 1 ones digit | feat. 1 tenths digit | feat. 1 hundredths digit plus sincos R1 | . (decimal point) | sincos R3 | feat. 2 ones digit | feat. 2 tenths digit | feat. 2 hundredths digit plus sincos R2 |

Figure 3:
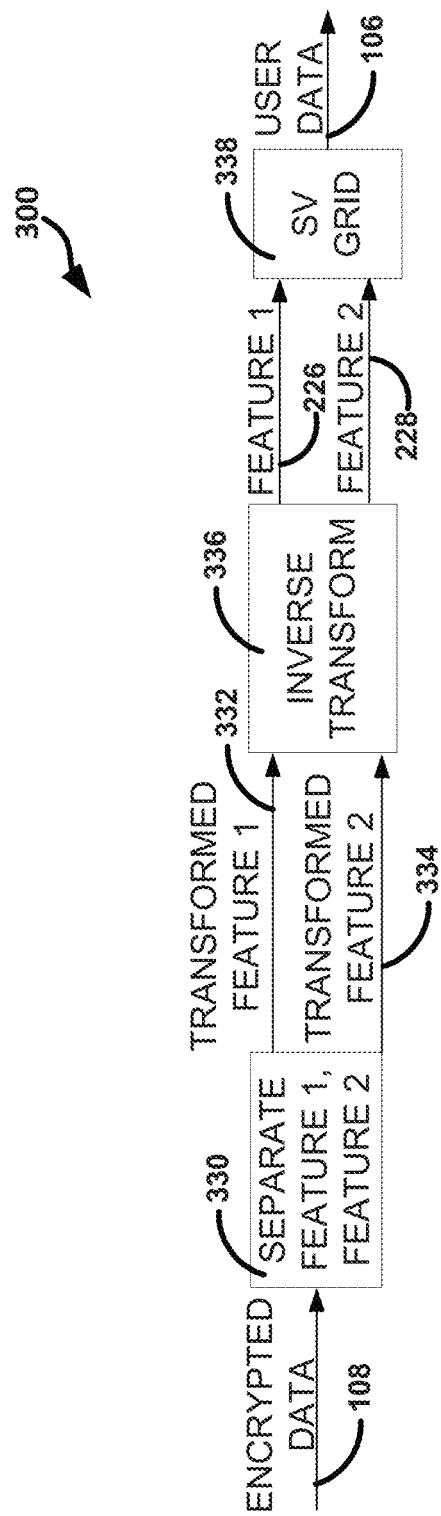
FIG. 3 illustrates, by way of example, a diagram of an embodiment of a method for decryption of the encrypted data.

FIG. 3 illustrates, by way of example, a diagram of an embodiment of a method 300 for decryption of the encrypted data 108. The method 300 includes separating (altered or transformed) feature 1 332 and feature 2 334 values from the encrypted value 108, at operation 330. In the example described above, the transformed feature 1 value is all digits to the left of the decimal and the transformed featured 2 value is all digits to right of the decimal. At operation 336, an inverse transform can be applied to the transformed features 332, 334 to generate the features 226, 228. The inverse transform in the example provided above can include:

$$feature1 =$$
$$(transformed\ feature1 - 1000*floor(transformed\ feature1/1000))/100$$

$$2feature =$$
$$(100*(transformed\ feature2 - floor(transformed\ feature2*10)/10)$$

$$feature2 = \left(\frac{floor(10*2feature)}{10}\right) - intermediate\ value\ \text{where}$$

$$intermediate\ value = \left(2feature - \frac{floor(10*2feature)}{10}\right)*0.5.$$

At operation 338, the features 226, 228 are mapped to an SV grid. Examples of SV grids are provided in FIGS. 4-5, among others. The SV grid is a grid of cells with feature 1 on a first axis and feature 2 on a second axis. The SV grid can include parameters defined such that an extent of a cell, when feature 1 and feature 2 are mapped thereto, correspond to a single output in the chosen encoding. The parameters of the SV grid include width of a cell (e.g., extent of the cell in the feature 1 direction), height of a cell (e.g., extent of the cell in the feature 2 direction), and number of cells (e.g., number of rows and number of columns of cells). Each cell can correspond to a single character of the encoding or nothing (have no encoding mapped thereto). In this way, the cell to which the features 226, 228 map can uniquely define the user data 106.

Figure 4:
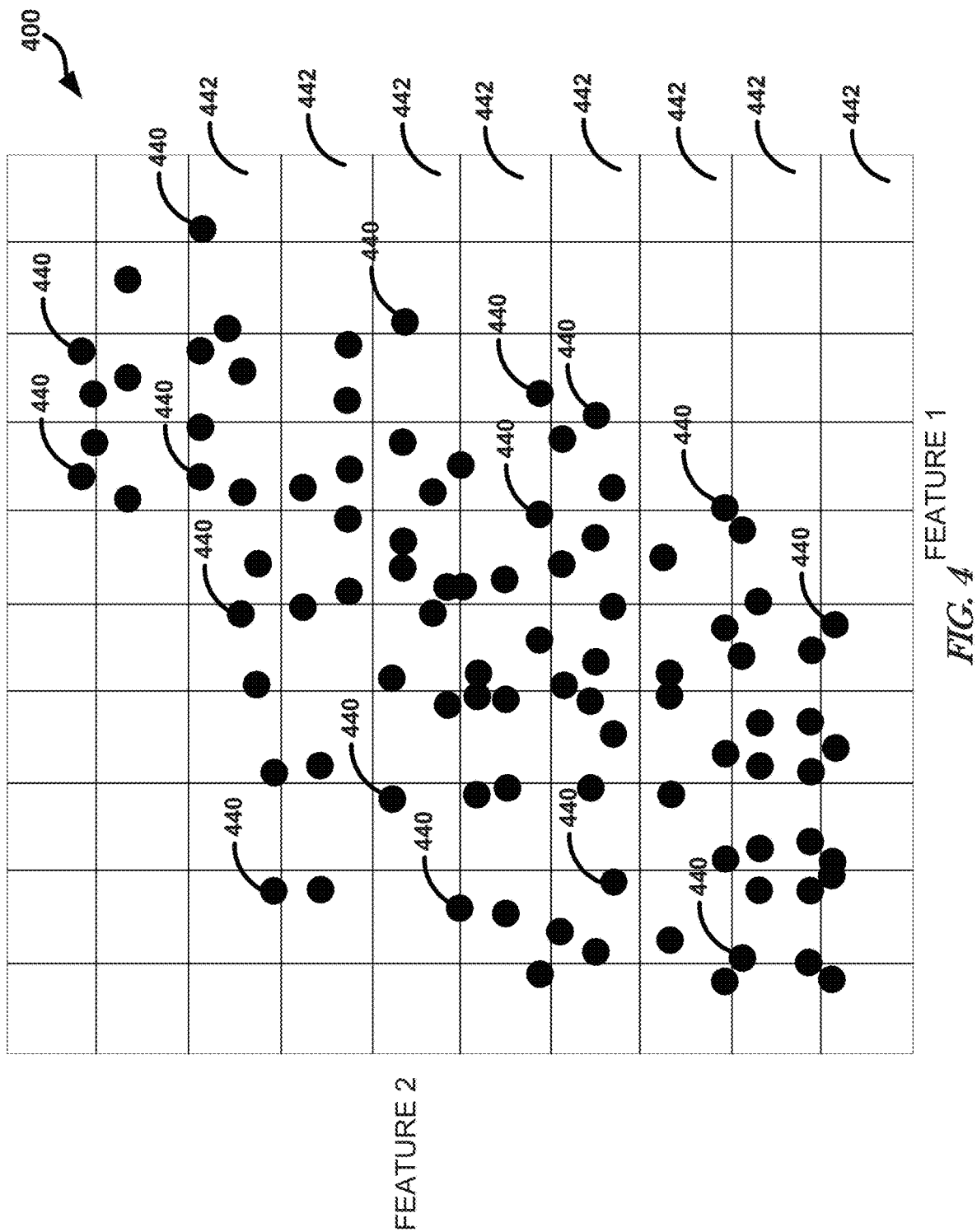
FIG. 4 illustrates, by way of example, a diagram of an embodiment of an SV grid with encoded data mapped thereto, such as by the SV operation.

FIG. 4 illustrates, by way of example, a diagram of an embodiment of an SV grid 400 with encoded data mapped thereto, such as by the SV operation 224. The SV grid 400 represents the feature 226 on the x-axis versus the feature 228 on the y-axis. The features 226, 228 of the encoded data are determined at the SV operation 224 and mapped to a cell 442 of the SV grid 400. This process can be repeated for each character in the encoding. For example, in the ASCII encoding there are 256 characters. Each of the characters can be encoded, sequenced, and mapped to a location in the SV grid 400. The dots 440 represent individual character mappings to the SV grid 400. Note that, in some embodiments, a portion of a cell 442 can represent a character, but such embodiments can consume more memory than what is optimal. In some embodiments, each cell 442 can represent an individual character in the encoding. For these embodiments, the cells 442 need to be of an extent, such that only a single dot 440 at most is mapped thereto. To accomplish this, the cell extent of the cells 442 can be reduced until only a single dot 440, at most, is mapped to a cell 442. This process is sometimes "deconflicting" a cell 442.

Figure 5:
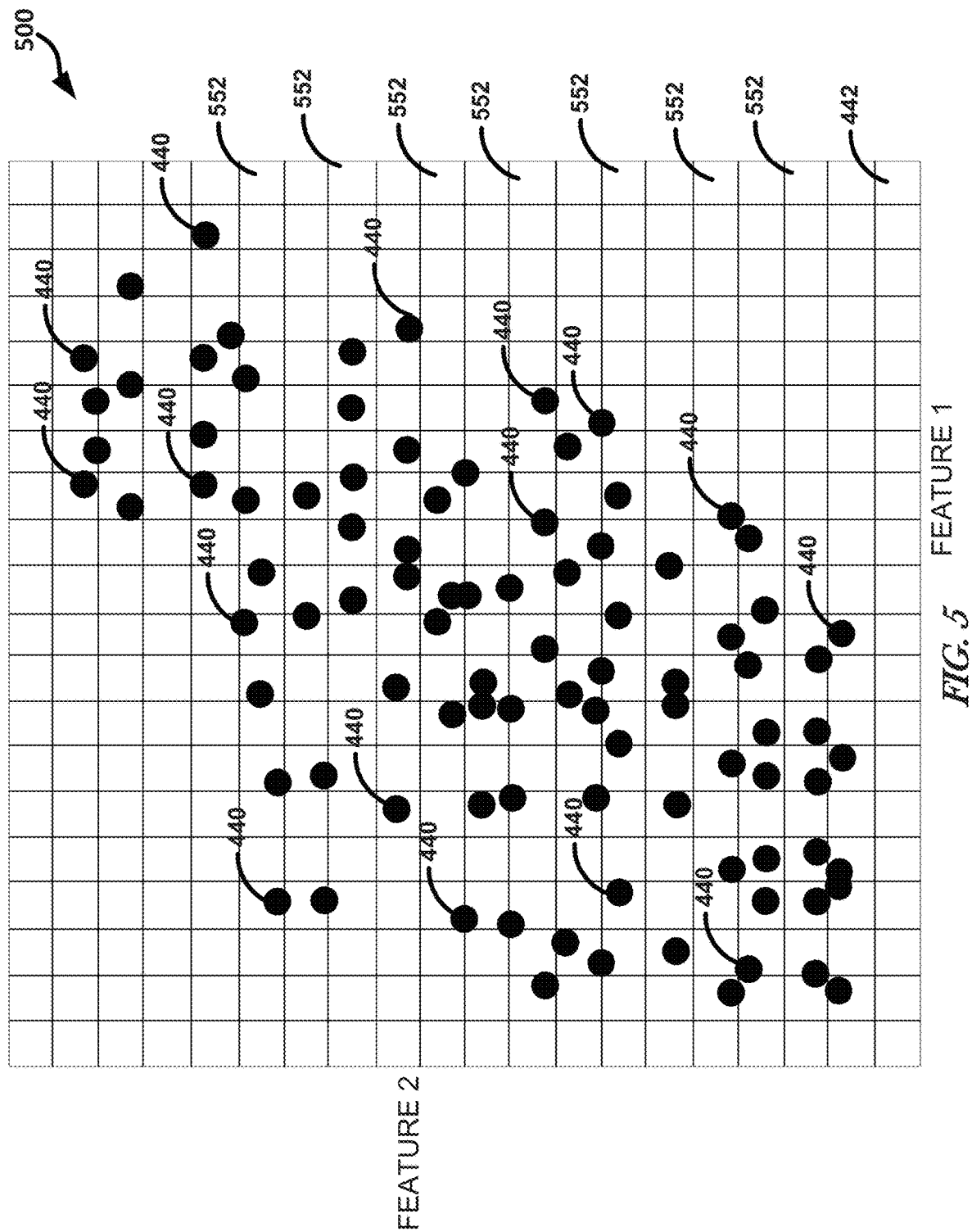
FIG. 5 illustrates, by way of example, a diagram of an embodiment of another SV grid that is deconflicted.

FIG. 5 illustrates, by way of example, a diagram of an embodiment of another SV grid 500 that is deconflicted. The dots 440 are mapped to the same locations of the SV grid 500 as they are in the SV grid 400, with cells 552 of the SV grid 500 including an extent defined such that only one character (at most) of the encoding is mapped thereto. The cells 552 each include a smaller extent as compared to the cells 442.

Figure 6:
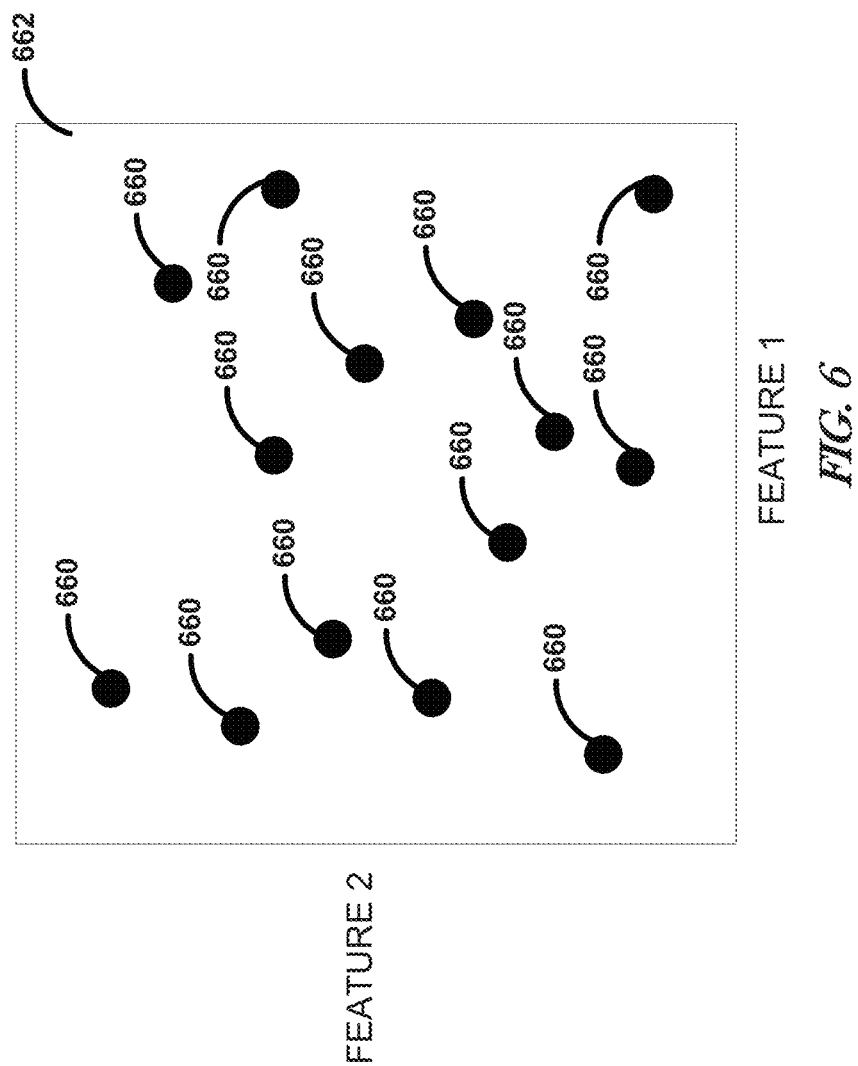
FIG. 6 illustrates, by way of example, an exploded view diagram of an embodiment of a cell of an SV grid.

FIG. 6 illustrates, by way of example, an exploded view diagram of an embodiment of a cell 662. The cell 662 has a defined extent in each feature 226, 228 direction. The cell 662 includes example user data 106 mapped thereto that is represented by the respective dots 660. For a deconflicted SV grid, all of the respective dots 660 map to a same character in the encoding. This gives flexibility to alter the mapping and further obscure the user data 106 that is represented by the encrypted data 108.

For example, consider the famous phrase "Hello World". Assume that an SV-based encryption technique encodes the user data 106 into an ASCII representation and then uses RM and RS features defined above along with some SINCOS perturbations to create the encrypted data 108. "Hello World" in ASCII is {072, 101, 108, 108, 111, 032, 087, 111, 114, 108, 100}. The ASCII encoding can be sequenced by operation 222 to be {007722, 110011, 110088, 111111, 003322, 008877, 111111, 111144, 110088, 110000}. These inputs can be operated on by the SV operation 224 to generate features 226, 228. The SINCOS function can be used to generate a series of values. The features 226, 228 can be altered at operation 230 or transformed at operation 232 based on one or more values of the series of values. The result of these operations can provide encrypted data 108 of {283.41, 81.080, 605.319, 604.317, 100.064, 208.105, 677.287, 101.065, 325.133, 606.318, 6.086} or {282.240, 80.081, 604.320, 606.316, 99.065, 207.104, 676.286, 102.064, 324.132, 605.319, 7.087}, both of which decrypt to "Hello World". Many other encrypted data values of the same message are viable.

Figure 7:
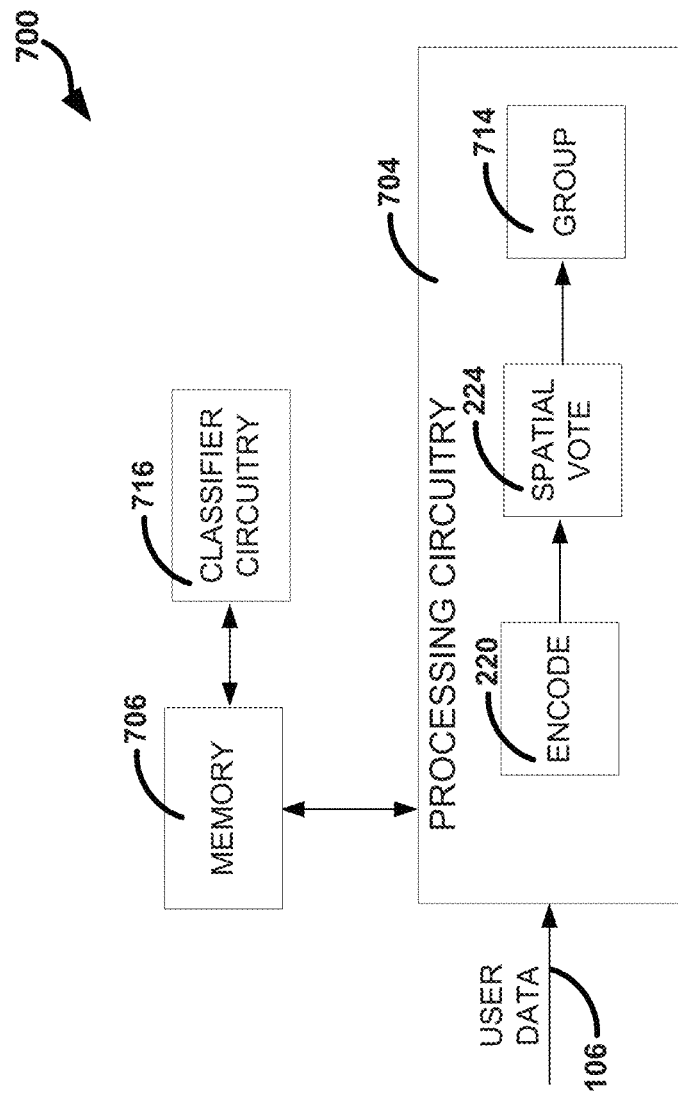
FIG. 7 illustrates, by way of example, a diagram of an embodiment of a system for SV.

FIG. 7 illustrates, by way of example, a diagram of an embodiment of a system 700 for SV, such as can perform the SV operation 224 or at least a portion of the operation 338. The system 700 as illustrated includes processing circuitry 704, classifier circuitry 716, and memory 706. The processing circuitry 704 can identify a cell to which the user data 106 maps. The classifier circuitry 716 can present a detected anomaly (user data 106 mapped to a cell that has not had an input mapped thereto before now) to a user for action, adjust SV grid parameters, or the like. The memory 706 can store key values, SV grid parameters, or other data input or output from the processing circuitry 704.

The processing circuitry 704 receives the user data 106. The user data 106 can include binary data, text, signal values, image values, or other data that can be transformed to a number. The processing circuitry 704 can transform the user data 106 to a number, at operation 220. The operation 220 can include encoding the input into a specified format, parsing the data into chunks (e.g., chunks of a specified size), or the like. For example, the operation 220 can include encoding text input to an American Standard Code for Information Interchange (ASCII) encoding to transform the user data 106 into numbers between zero (0) and two hundred fifty-five (255). In another example, the operation 220 can include converting chunks of binary data to their numerical equivalent, such as two's complement, unsigned integer, floating number (e.g., short or long), or the like. In yet another example, the operation 220 can include performing an analog to digital conversion on analog signal data, such as by an analog to digital converter. In yet another example, the operation 220 can include combining red, green, blue (RGB) values of a color image, or the like, to generate a number. Not all the user data 106 needs to be transformed, thus the operation 220 is optional.

The processing circuitry 704 can receive numbers either as raw user data 106 or from the operation 220 and determine two features (discussed below) at operation 224. The operation 224 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2 ... n.

RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups, but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same features can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 224. The processing circuitry 704 can initialize an SV grid to which the encoded inputs are mapped, such as at operation 224.

Plotted values can be associated or correlated, such as at operation 714. The operation 714 can include forming groups of mapped inputs and determining an extent thereof. More details regarding the operations 220, 224, 714 are provided in FIGS. 8-10.

The classifier circuitry 716 can provide a user with a report indicating behavior that is anomalous. An input mapped to a cell that was not previously populated is considered anomalous. If an input is mapped to a cell that already has an input mapped thereto by the features, the input can be considered recognized or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 716, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 716 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 706 and monitored by the processing circuitry 704.

In some embodiments, an event for the report can include a single anomalous behavior. In some embodiments, an event for the report can be reported in response to a specified threshold number of type 2 anomalies.

The classifier circuitry 716 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row} = \text{int}(\text{Key Value}/(\text{number of cells on side})) \quad \text{Equation 10}$$

$$\text{Col} = \text{Key Value} - \text{int}(\text{Row}*(\text{number of cells on side})) \quad \text{Equation 11}$$

$$\text{Center1} = x\ \text{min} + \text{Col}*(x\ \text{range})/(\text{num.col}-1) \quad \text{Equation 12}$$

$$\text{Center2} = y\ \text{min} + \text{Row}*(y\ \text{range})/(\text{num.row}-1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 8:
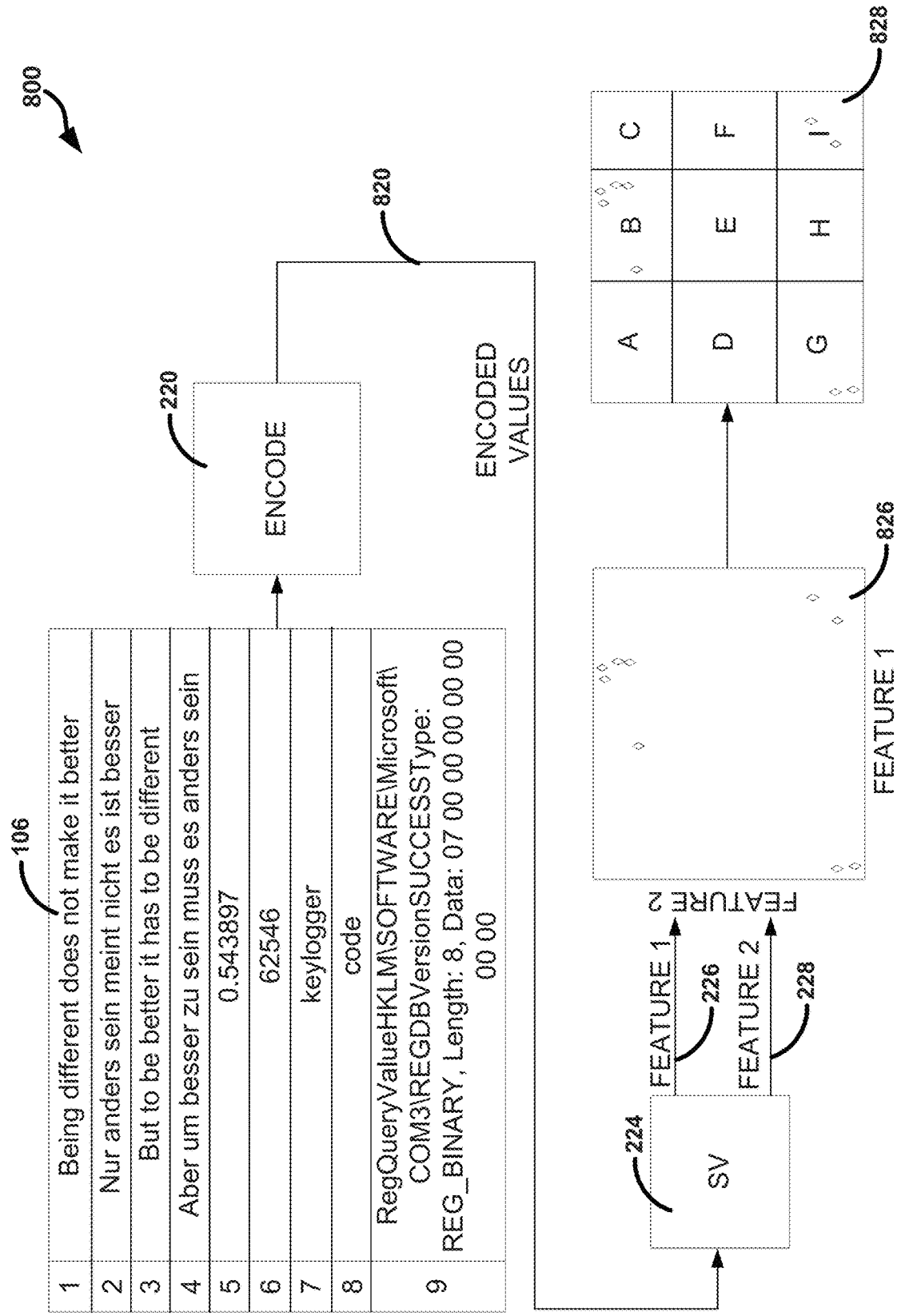
FIG. 8 illustrates, by way of example, a diagram of an embodiment of a method for SV.

FIG. 8 illustrates, by way of example, a diagram of an embodiment of a method 800 for SV. The method 800 as illustrated includes receiving the user data 106. The user data 106 in FIG. 8 includes nine text strings labelled "1"-"9". Each of the text strings "1"-"9" of the user data 106 is respectively transformed to encoded values 820 at operation 220. An example transformation is ASCII encoding which transforms text to numerical values. The transformed values 820 can be used to perform the operation 224. The operation 224 can include determining two features 226, 228 of the user data 106 and plotting them against each other on a feature graph 826. The features 226, 228 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$, is the ASCII value of each character and the features are determined over all ASCII encodings of the characters of the input data item "1". As an example, the resultant RM can be feature 1 226 and the resultant RS can be feature 2 228, or vice versa. This is merely an example and any order-dependent feature can be chosen for feature 1 and any order-dependent feature chosen for feature 2. Each of the input data items "1"-"9" can be processed in this manner at operation 220, 224.

The graph 826 can then be split into cells to form a grid 828. The cells of FIG. 8 are labelled "A"-"I" for illustration (Key Values are numeric labels of the SV grid cells from Equation 16). User data 106 mapped to a same cell can be considered similar. Similar user data 106 can be mapped to a same character of the encoding. User data 106 mapped to an empty cell can be considered anomalous. In the grid 828, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent user data 106 were to be received and mapped to cell "A", "C", "D", "E", "F", or "H" it can be deemed anomalous, as it is a behavior that has not been received before and is sufficiently different from other behaviors that have been seen previously.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

Figure 9:
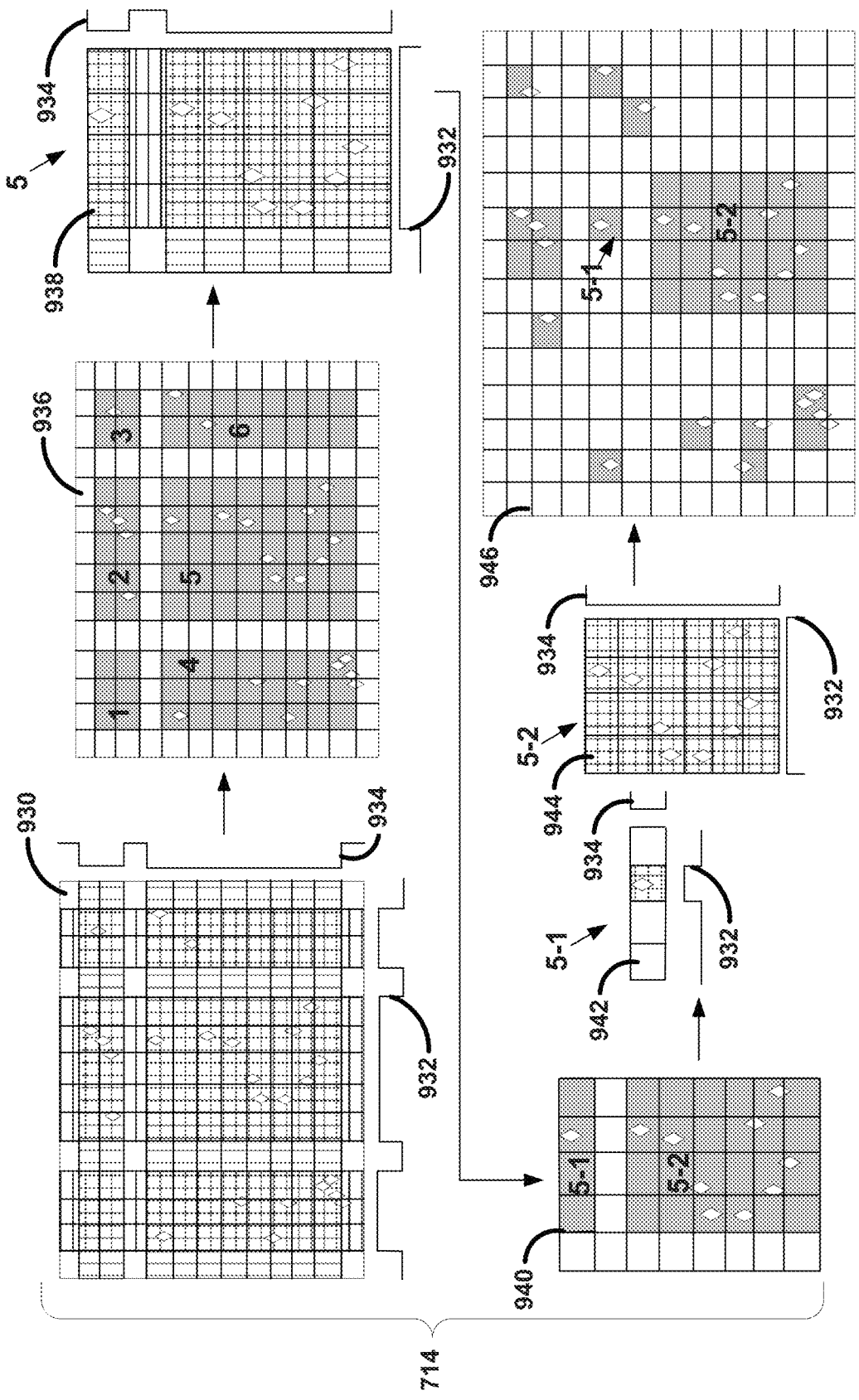
FIG. 9 illustrates, by way of example, a diagram of an embodiment of a grouping operation.

FIG. 9 illustrates, by way of example, a diagram of an embodiment of the operation 714. Encoded inputs ((x, y) points) are represented by diamonds. The operation 714 (sometimes called shadowing for group extraction) can include an iterative process that identifies cells that are populated and aggregates and separates those cells into groups. The iterative process can include:

1) Identifying cells of columns with at least one populated cell at operation 932 (indicated by horizontal hashing in graph 930)
2) Identifying cells of rows with at least one populated cell at operation 934 (indicated by vertical hashing in graph 930)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 936 illustrates the result of a first iteration of performing the operations (1)-(3). After the first iteration, six groups "1"-"6" in FIG. 9 are formed. Next each of the groups "1"-"6" are processed by operations (1)-(3). In FIG. 9, the second iteration is illustrated for group "5". The operations 932 and 934 can be performed on a sub-grid 938 formed by the cells of group "5". A graph 940 illustrates the result of the second iteration of performing the operations (1)-(3). After a second iteration on group "5", two sub-groups "5-1" and "5-2" are formed in the example of FIG. 9.

In the example of FIG. 9, a third iteration of the operations (1)-(3) is performed on the subgroups "5-1" and "5-2". The operations 932 and 934 can be performed on sub-grids 942, 944 formed by the cells of sub-groups "5-1" and "5-2". A graph 946 illustrates the result of the performing all iterations of the operations (1)-(3) and the groups formed therefrom.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col} = \text{int}((\text{feature } 1 - x \text{ min}) * (\text{num.col} - 1)/(x \text{ range})) \quad \text{Equation 14}$$

$$\text{Row} = \text{int}((\text{feature } 2 - y \text{ min}) * (\text{num.row} - 1)/(y \text{ range})) \quad \text{Equation 15}$$

An encoding on the grid, sometimes called key value, can be determined using Equation 16:

$$\text{Key Value} = \text{num.row} * \text{Row} + \text{Col} \quad \text{Equation 16}$$

The "x min", "y min", "x max", and "y max" can be stored in the memory 106. Other values that can be stored in the memory 106 and relating to the grid of cells include "max grid size", "min grid size", or the like. These values can be used by the processing circuitry 104 to determine "x range", "num. col.", "y range", or "num. row", such as to assemble the grid of cells or determine a key value for a given encoded input (e.g., (feature 1, feature 2)).

A series of key values representing sequential inputs can be stored in the memory 106 and used by the classifier circuitry 716, such as to detect malicious (not necessarily anomalous) behavior. A malicious or other behavior of interest can be operated on by the processing circuitry 704 and the key values of the behavior can be recorded. The key values can be stored and associated with the malicious behavior. Key values subsequently generated by the processing circuitry 704 can be compared to the key values associated with the malicious behavior to detect the malicious behavior in the future.

Figure 10:
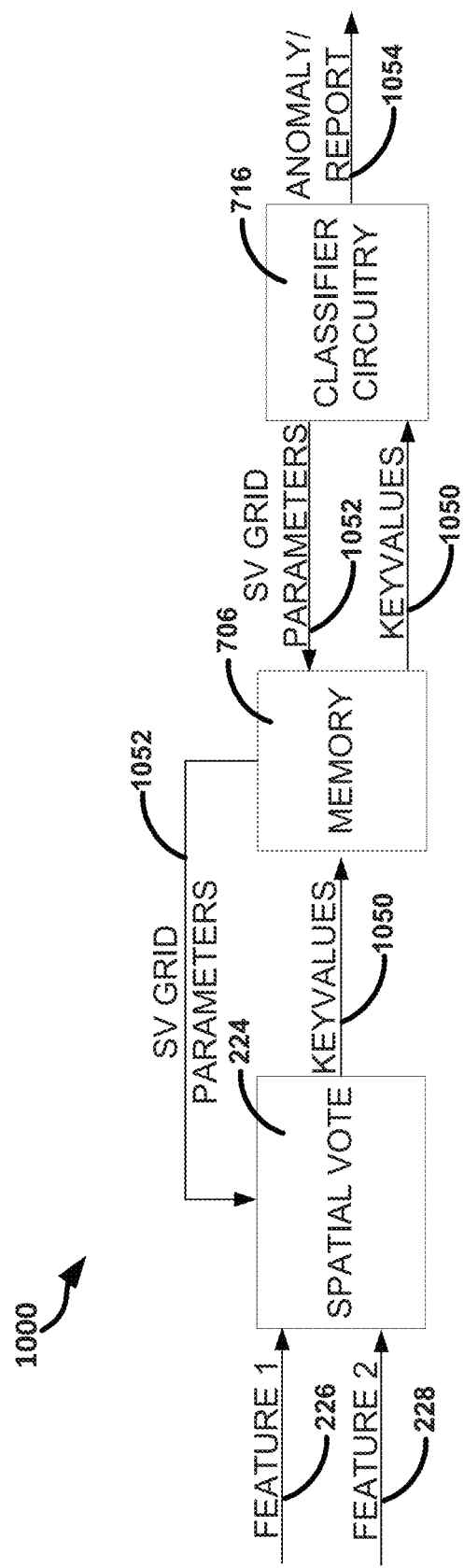
FIG. 10 illustrates, by way of example, a diagram of an embodiment of a system for SV.

FIG. 10 illustrates, by way of example, a diagram of an embodiment of a system 1000 for SV. The system 1000 includes an exploded view diagram of a portion of the system 700. The system 1000 as illustrated includes the operation 224 of the processing circuitry 704, the memory 706, and classifier circuitry 716. The operation 224 determines key values 1050 based on SV grid parameters 1052 from the memory 706 and features 226, 228 determined by the processing circuitry 704.

The key values in the memory 706 can allow for F-testing, t-testing, or Z-score analysis, such as by the classifier circuitry 716. These analyses can help identify significant columns and cells. The classifier circuitry 716 can provide event and pre-event logs in a report 1054, such as for further analysis. The report 1054 can provide information on which column or cell corresponds to the most different behavior.

Figure 11:
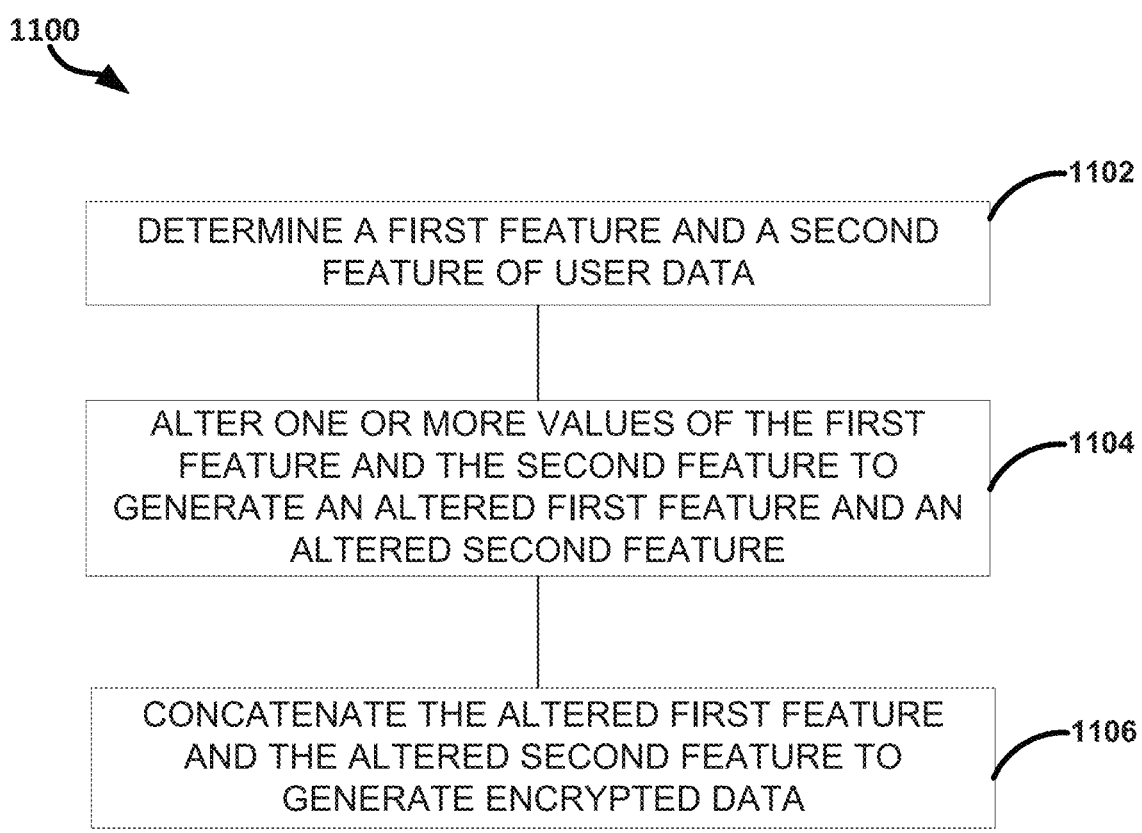
FIG. 11 illustrates, by way of example, a diagram of an embodiment of a method for encryption using SV.

FIG. 11 illustrates, by way of example, a diagram of an embodiment of a method 1100 for encryption using SV. The method 1100 as illustrated includes determining a first feature and a second feature of user data, at operation 1102; altering one or more values of the first feature and the second feature to generate an altered first feature and an altered second feature, at operation 104; and concatenating the altered first feature and the altered second feature to generate encrypted data, at operation 106. The method 1100 can further include, wherein the first feature and the second feature correspond to a cell of a subset of cells of a grid of cells, each cell of the subset of cells including a character associated therewith.

The method 1100 can further include providing the encrypted data to a device, wherein altering the one or more values of the first feature and the second feature includes introducing a deterministic amount of noise to a digit of the one or more values. The method 1100 can further include, wherein the deterministic amount of noise is determined using a mathematical combination of orthogonal functions. The method 1100 can further include, wherein the orthogonal functions are sine and cosine.

The method 1100 can further include, wherein altering the one or more values of the first feature and the second feature includes generating a series of two or more values using the orthogonal functions. The method 1100 can further include, wherein the orthogonal functions operate on a counter variable that changes value between generating consecutive numbers in the series of two or more values.

The method 1100 can further include, wherein each cell in the subset of the cells includes only a single character associated therewith. The method 1100 can further include encoding the user data into a predefined set of numerical values. The method 1100 can further include, wherein the number of cells in the subset is equal to a number of numerical values in the predefined set of numerical values.

The method 1100 can further include repeating each digit of encoded user data such that the value of each digit in the encoded user data appears at least twice, consecutively to generate a repetitious encoding. The method 1100 can further include, wherein the first feature and the second feature are determined based on the repetitious encoding.

Figure 12:
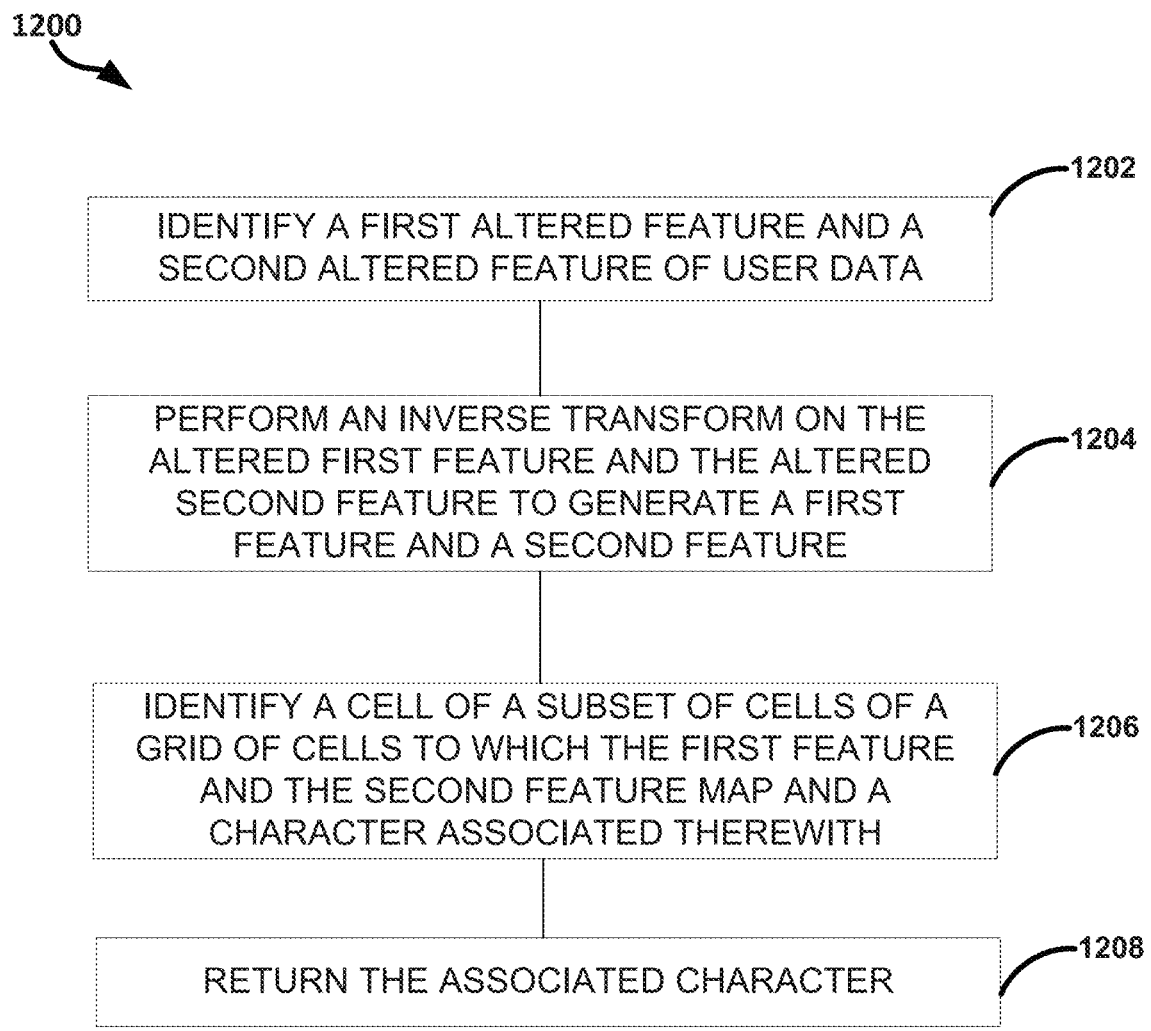
FIG. 12 illustrates, by way of example, a diagram of an embodiment of a method for decryption using SV.
Figure 13:
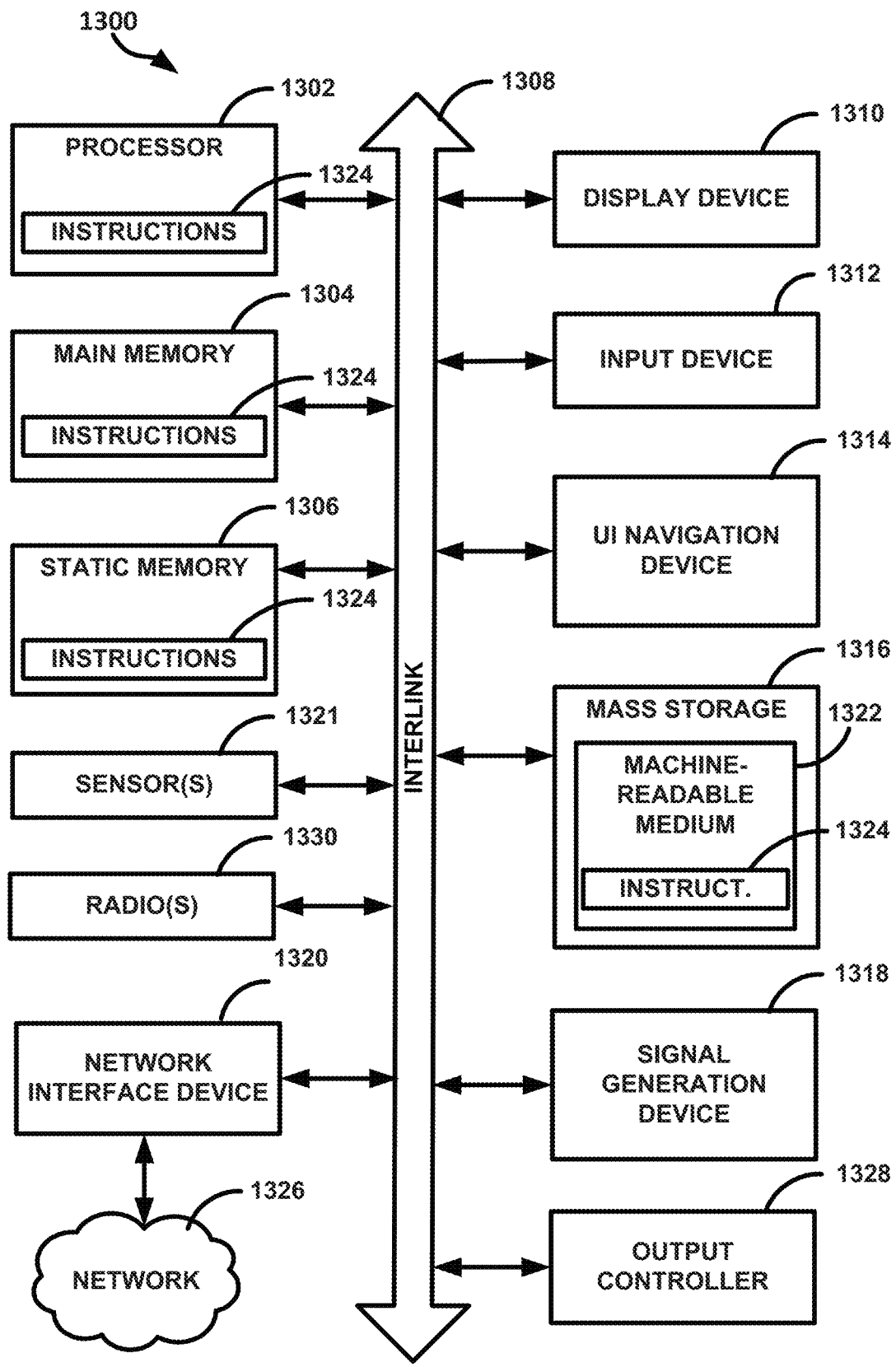
FIG. 13 illustrates, by way of example, a block diagram of an embodiment of a machine on which one or more of the methods, such as those discussed about FIGS. 2, 3, 8, 11, and 12 and elsewhere herein can be implemented.

FIG. 12 illustrates, by way of example, a diagram of an embodiment of a method 1200 for decryption using SV. The method 1200 as illustrated includes identifying an altered first feature and an altered second feature of encrypted data, at operation 1202; performing an inverse transform on the altered first feature and the altered second feature to generate a first feature and a second feature, at operation 1204; identifying a cell of a subset of the cells of a grid of cells to which the first feature and the second feature map and the character associated therewith, each cell of the subset of cells including a character associated therewith, at operation 1206; and returning the associated character, at operation 1208.

The method 1200 can further include, wherein the encrypted data includes the altered first feature and the altered second feature concatenated and identifying the altered first feature and the altered second feature includes separating a specified, consecutive number of digits of the encrypted data from the encrypted data. The method 1200 can further include, wherein the altered first feature and the altered second feature include a deterministic amount of noise to a digit thereof and performing the inverse transform removes the noise.

The method 1200 can further include, wherein the deterministic amount of noise is determined using a mathematical combination of orthogonal functions. The method 1200 can further include, wherein the orthogonal functions are sine and cosine. The method 1200 can further include, wherein each cell in the subset of the cells includes only a single character associated therewith.

The method 1200 can further include, wherein the encrypted data is encoded into a predefined set of numerical values. The method 1200 can further include, wherein the number of cells in the subset is equal to a number of numerical values in the predefined set of numerical values.

FIG. 12 illustrates, by way of example, a block diagram of an embodiment of a machine 1300 on which one or more of the methods, such as those discussed about FIGS. 2-12 and elsewhere herein can be implemented. In one or more embodiments, the system 100, 700, 1000, or elsewhere herein can be implemented by the machine 1300. In alternative embodiments, the machine 1300 operates as a stand-alone device or may be connected (e.g., networked) to other machines. In a networked deployment, the machine 1300 may operate in the capacity of a server or a client machine in server-client network environment, or as a peer machine in a peer-to-peer (or distributed) network environment. The machine 1300 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1300 includes processing circuitry 1302 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1321 (e.g., a transducer that converts one form of energy (e.g., light, heat, electrical, mechanical, or other energy) to another form of energy), or the like, or a combination thereof), a main memory 1304 and a static memory 1306, which communicate with each other and all other elements of machine 1300 via a bus 1308. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 1300 (e.g., computer system) may further include a video display unit 1310 (e.g., a liquid crystal display (LCD) or a cathode ray tube (CRT)). The machine 1300 also includes an alphanumeric input device 1312 (e.g., a keyboard), a user interface (UI) navigation device 1314 (e.g., a mouse), a disk drive or mass storage unit 1316, a signal generation device 1318 (e.g., a speaker) and a network interface device 1320.

The mass storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processing circuitry 1302 during execution thereof by the machine 1300, the main memory 1304 and the processing circuitry 1302 also constituting machine-readable media. One or more of the main memory 1304, the mass storage unit 1316, or other memory device can store the data for executing a method discussed herein.

The machine 1300 as illustrated includes an output controller 1328. The output controller 1328 manages data flow to/from the machine 1300. The output controller 1328 is sometimes called a device controller, with software that directly interacts with the output controller 1328 being called a device driver.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of several well-known transfer protocols (e.g., hypertext transfer protocol (HTTP), user datagram protocol (UDP), transmission control protocol (TCP)/internet protocol (IP)). The network 1326 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

This disclosure can be understood with a description of some embodiments, sometimes called examples.

Example 1 can include a system for encryption using SV, the system comprising a memory including data indicating a grid size for a grid of cells, a number of cells in the grid of cells and for only a subset of the cells one or more characters associated therewith, processing circuitry coupled to the memory, the processing circuitry being configured to determine a first feature and a second feature of user data, wherein the first feature and the second feature correspond to a cell of the subset of the cells, alter one or more values of the first feature and the second feature to generate an altered first feature and an altered second feature, and concatenate the altered first feature and the altered second feature to generate encrypted data.

In Example 2, Example 1 can further include, wherein the processing circuitry is further configured to provide the encrypted data to a device, and wherein altering the one or more values of the first feature and the second feature includes introducing a deterministic amount of noise to a digit of the one or more values.

In Example 3, Example 2 can further include, wherein the deterministic amount of noise is determined using a mathematical combination of orthogonal functions.

In Example 4, Example 3 can further include, wherein the orthogonal functions are sine and cosine.

In Example 5, at least one of Examples 3-4 can further include, wherein altering the one or more values of the first feature and the second feature includes generating a series of two or more values using the orthogonal functions, and the orthogonal functions operate on a counter variable that changes value between generating consecutive numbers in the series of two or more values.

In Example 6, at least one of Examples 1-5 can further include, wherein each cell in the subset of the cells includes only a single character associated therewith.

In Example 7, Example 6 can further include, wherein the processing circuitry is further configured to encode the user data into a predefined set of numerical values; and the number of cells in the subset is equal to a number of numerical values in the predefined set of numerical values.

In Example 8, Example 7 can further include, wherein the processing circuitry is further configured to repeat each digit of encoded user data such that the value of each digit in the encoded user data appears at least twice, consecutively to generate a repetitious encoding, and wherein the first feature and the second feature are determined based on the repetitious encoding.

Example 9 includes a system for decryption using spatial voting, the system comprising a memory including data indicating a grid size for a grid of cells, a number of cells in the grid of cells and for only a subset of the cells a character associated therewith, processing circuitry coupled to the memory, the processing circuitry being configured to identify an altered first feature and an altered second feature of encrypted data, perform an inverse transform on the altered first feature and the altered second feature to generate a first feature and a second feature, identify a cell of the subset of the cells, to which the first feature and the second feature map, and the character associated therewith, and return the associated character.

In Example 10, Example 9 can further include, wherein the encrypted data includes the altered first feature and the altered second feature concatenated and identifying the altered first feature and the altered second feature includes separating a specified, consecutive number of digits of the encrypted data from the encrypted data.

In Example 11, at least one of Examples 9-10 can further include, wherein the altered first feature and the altered second feature include a deterministic amount of noise to a digit thereof and performing the inverse transform removes the noise.

In Example 12, Example 11 can further include, wherein the deterministic amount of noise is determined using a mathematical combination of orthogonal functions.

In Example 13, Example 12 can further include, wherein the orthogonal functions are sine and cosine.

In Example 14, at least one of Examples 9-13 can further include, wherein each cell in the subset of the cells includes only a single character associated therewith.

In Example 15, Example 14 can further include, wherein the encrypted data is encoded into a predefined set of numerical values, and the number of cells in the subset is equal to a number of numerical values in the predefined set of numerical values.

Example 16 includes a method for encrypting user data using spatial voting, the method comprising determining a first feature and a second feature of user data, wherein the first feature and the second feature correspond to a cell of a subset of cells of a grid of cells, each cell of the subset of cells including a character associated therewith, altering one or more values of the first feature and the second feature to generate an altered first feature and an altered second feature, and concatenating the altered first feature and the altered second feature to generate encrypted data.

In Example 17, Example 16 can further include providing the encrypted data to a device, wherein altering the one or more values of the first feature and the second feature includes introducing a deterministic amount of noise to a digit of the one or more values.

In Example 18, Example 17 can further include, wherein the deterministic amount of noise is determined using a mathematical combination of orthogonal functions.

In Example 19, Example 18 can further include, wherein the orthogonal functions are sine and cosine.

In Example 20, at least one of Examples 18-19 can further include, wherein altering the one or more values of the first feature and the second feature includes generating a series of two or more values using the orthogonal functions, and the orthogonal functions operate on a counter variable that changes value between generating consecutive numbers in the series of two or more values.

In Example 21, at least one of Examples 16-20 can further include, wherein each cell in the subset of the cells includes only a single character associated therewith.

In Example 22, Example 21 can further include, wherein the method further includes encoding the user data into a predefined set of numerical values, and the number of cells in the subset is equal to a number of numerical values in the predefined set of numerical values.

In Example 23, Example 22 can further include, wherein the method further includes repeating each digit of encoded user data such that the value of each digit in the encoded user data appears at least twice, consecutively to generate a repetitious encoding, and wherein the first feature and the second feature are determined based on the repetitious encoding.

Example 24 includes a method for decryption using spatial voting, the method comprising identifying an altered first feature and an altered second feature of encrypted data, performing an inverse transform on the altered first feature and the altered second feature to generate a first feature and a second feature, identifying a cell of a subset of the cells of a grid of cells to which the first feature and the second feature map and the character associated therewith, each cell of the subset of cells including a character associated therewith, and returning the associated character.

In Example 25, Example 24 can further include, wherein the encrypted data includes the altered first feature and the altered second feature concatenated and identifying the altered first feature and the altered second feature includes separating a specified, consecutive number of digits of the encrypted data from the encrypted data.

In Example 26, at least one of Examples 24-25 can further include, wherein the altered first feature and the altered second feature include a deterministic amount of noise to a digit thereof and performing the inverse transform removes the noise.

In Example 27, Example 26 can further include, wherein the deterministic amount of noise is determined using a mathematical combination of orthogonal functions.

In Example 28, Example 27 can further include, wherein the orthogonal functions are sine and cosine.

In Example 29, at least one of Examples 24-28 can further include, wherein each cell in the subset of the cells includes only a single character associated therewith.

In Example 30, at least one of Examples 24-29 can further include, wherein the encrypted data is encoded into a predefined set of numerical values, and the number of cells in the subset is equal to a number of numerical values in the predefined set of numerical values.

Example 31 includes a non-transitory machine-readable medium including instructions that, when executed by a machine, configure to the machine to perform the method of one of Examples 16-30.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for encryption using spatial voting, the system comprising:
 a memory including data indicating a grid size for a grid of cells, the grid of cells including values of a first feature of user data along rows and values of a second feature of user data along columns thereof, a number of cells in the grid of cells, and only a subset of the cells including one or more characters associated therewith;

processing circuitry coupled to the memory, the processing circuitry being configured to:
determine a first feature value of the first feature of user data and a second feature value of the second feature of the user data, wherein the first feature value and the second feature value map to a cell of the subset of the cells;
alter, using a mathematical combination of orthogonal functions, one or more values of the determined first feature value and the determined second feature value to generate an altered first feature value and an altered second feature value; and
concatenate the altered first feature value and the altered second feature value to generate encrypted data.

2. The system of claim 1, wherein:
the processing circuitry is further configured to provide the encrypted data to a device, and altering the one or more values of the first feature and the second feature includes introducing a deterministic amount of noise to a digit of the one or more values.

3. The system of claim 1, wherein the orthogonal functions are sine and cosine.

4. The system of claim 1, wherein:
altering the one or more values of the first feature and the second feature includes generating a series of two or more values using the orthogonal functions; and
the orthogonal functions operate on a counter variable that changes value between generating consecutive numbers in the series of two or more values.

5. The system of claim 1, wherein each cell in the subset of the cells includes only a single character associated therewith.

6. The system of claim 5, wherein:
the processing circuitry is further configured to encode the user data into a predefined set of numerical values; and
the number of cells in the subset is equal to a number of numerical values in the predefined set of numerical values.

7. The system of claim 6, wherein:
the processing circuitry is further configured to repeat each digit of encoded user data such that the value of each digit in the encoded user data appears at least twice, consecutively to generate a repetitious encoding; and
wherein the first feature and the second feature are determined based on the repetitious encoding.

8. A system for decryption using spatial voting, the system comprising:
a memory including data indicating a grid size for a grid of cells, the grid of cells including values of a first feature of user data along rows and values of a second feature of user data along columns thereof, a number of cells in the grid of cells and only a subset of the cells including a character associated therewith;
processing circuitry coupled to the memory, the processing circuitry being configured to:
identify an altered first feature and an altered second feature of encrypted data that includes the altered first feature concatenated with the altered second feature;
perform an inverse transform on the altered first feature and the altered second feature to generate a first feature and a second feature, including removing noise added to one or more of the first feature and the second feature using a mathematical combination of mathematical functions;
identify a cell of the subset of the cells, to which the first feature and the second feature map, and the character associated therewith; and
return the associated character.

9. The system of claim 8, wherein identifying the altered first feature and the altered second feature includes separating a specified, consecutive number of digits of the encrypted data from the encrypted data.

10. The system of claim 8, wherein the altered first feature and the altered second feature include a deterministic amount of noise added to a digit thereof.

11. The system of claim 8, wherein the orthogonal functions are sine and cosine.

12. The system of claim 8, wherein each cell in the subset of the cells includes only a single character associated therewith.

13. The system of claim 12, wherein:
the encrypted data is encoded into a predefined set of numerical values; and
the number of cells in the subset is equal to a number of numerical values in the predefined set of numerical values.

14. A method for encrypting user data using spatial voting, the method comprising:
determining a first feature value of a first feature of user data and a second feature value of a second feature of user data, wherein the first feature value and the second feature value correspond to a cell of a subset of cells of a grid of cells, the grid of cells including values of a first feature along rows and values of a second feature along columns thereof, each cell of the subset of cells including a character associated therewith;
altering, using a mathematical combination of orthogonal functions, one or more values of the determined first feature value and the second feature value to generate an altered first feature value and an altered second feature value; and
concatenating the altered first feature value and the altered second feature value to generate encrypted data.

15. The method of claim 14, further comprising providing the encrypted data to a device, wherein altering the one or more values of the first feature and the second feature includes introducing a deterministic amount of noise to a digit of the one or more values.

16. The method of claim 14, wherein the orthogonal functions are sine and cosine.

17. The method of claim 14, wherein:
altering the one or more values of the first feature and the second feature includes generating a series of two or more values using the orthogonal functions; and
the orthogonal functions operate on a counter variable that changes value between generating consecutive numbers in the series of two or more values.

* * * * *